United States Patent [19]
Tani et al.

[11] Patent Number: 5,877,487
[45] Date of Patent: *Mar. 2, 1999

[54] DATA SYMBOL READING DEVICE

[75] Inventors: Nobuhiro Tani; Makoto Nukui; Takeharu Shin; Yukihiro Ishizuka; Shuzo Seo, all of Tokyo, Japan

[73] Assignee: Asahi Kogaku Kogyo Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 666,864

[22] Filed: Jun. 19, 1996

[30]     Foreign Application Priority Data

Jun. 21, 1995  [JP]  Japan .................................... 7-179534

[51] Int. Cl.$^6$ ....................................................... G06K 7/12
[52] U.S. Cl. .......................... 235/469; 235/472; 235/465
[58] Field of Search ................................... 235/465, 469, 235/472

[56]          References Cited

U.S. PATENT DOCUMENTS 4,249,827  2/1981  Dimatteo et al. .
4,488,679  12/1984  Bockholt et al. ........................ 235/469
4,603,976  8/1986  Fetzer et al. ............................. 235/469
4,818,847  4/1989  Hara et al. ............................... 235/465

FOREIGN PATENT DOCUMENTS 0169383  4/1986  European Pat. Off. .
0342772  11/1989  European Pat. Off. .
0488177  11/1991  European Pat. Off. .
0516927  12/1992  European Pat. Off. .
1314786  4/1973  United Kingdom .
2222050  2/1990  United Kingdom .

*Primary Examiner*—Harold Pitts
*Attorney, Agent, or Firm*—Greenblum & Bernstein, P.L.C.

[57]                ABSTRACT

A data symbol reading device is provided with a white light source, a single-color LED light source, and mode selection switches. The reading device is controlled to have a symbol reading mode, a color image scanning mode, and a monochrome image scanning mode based on the position of the selection switches. The reading device transmits data as appropriate to a host computer. Alternatively, the symbol reading device is provided with red, green, and blue single-color light sources, and has the same modes. Further, the symbol reading device may be provided with a three or four color filter wheel and a white light source to generate the color and monochrome images.

21 Claims, 15 Drawing Sheets

DATA SYMBOL READING DEVICE

RELATED APPLICATIONS

Priority of Related Japanese HEI 7-179534 Jun. 21, 1995 is claimed.

BACKGROUND OF THE INVENTION

The present invention relates to a data symbol reading device for reading an encoded data symbol, such as a two dimensional data symbol.

Conventionally, there is known a data symbol reading device which can read product information in the form of a bar code. This type of data symbol reading device is commonly used with point of sale terminals to facilitate inventory control, etc. However, since the reading of bar codes only requires a one-dimensional scan along the length of the bar code, the amount of information that can be stored in a bar code is limited.

Recently, two types of data symbol reading devices, which can read a two dimensional tessellated data symbol affixed to a product, have been developed for use at point of sale terminals. The two types of data symbol reading devices employ different imaging devices. The first type of data symbol reading device uses an area sensor type of imaging device, such as a CCD. The CCD can read the entire pattern of the two dimensional data symbol without being moved with respect to the data symbol, and therefore the data symbol can be read quickly.

The second type of data symbol reading device uses a line sensor type of imaging device. The line sensor reads the data symbol line by line, and must be moved in a sub-scanning direction relative to the data symbol.

However, in the conventional data symbol reading device in which the area sensor is employed, since there is only one kind of light source for illuminating the data symbol, the usefulness of the data symbol reading device is limited.

SUMMARY OF THE INVENTION

It is therefore an object of the present invention to provide an improved data symbol reading device which can read many different types of data symbols, and generate electronic images of the data symbols.

According to a first aspect of the present invention, there is provided a data symbol reading device for reading a data symbol which includes a device for projecting a plurality of different colored light beams onto the data symbol, an imaging device having a light receiving surface, and an image forming device for forming an image of the data symbol on the light receiving surface of the imaging device.

Therefore, the color of the light projected onto the data symbol may be controlled easily by controlling the number of different colored light beams.

In the preferred embodiment, the data symbol reading device controls the device for projecting the light to project one of white light and another predetermined color of light. Preferably, the white light is provided by a whiter light source, such as a xenon lamp or halogen lamp, and the predetermined color of light is provided by a monochromatic light source, such as an LED.

In another preferred embodiment, the device for projecting light includes a first light source for emitting a first predetermined color of light, a second light source for emitting a second predetermined color of light, and a third light source for emitting a third predetermined color of light.

Further, the data symbol reading device can be operated in one of three modes. The three modes include a data symbol reading mode in which the data symbol is scanned and decoded, a color image forming mode, in which an image signal containing information related to a color image of the data symbol is output, and a monochrome image mode in which an image signal containing information related to a monochromatic image of the data symbol is output.

The data symbol reading device controls a driving device to drive only one of the first light source, the second light source and the third light source in response to the mode selecting device selecting the symbol reading mode, and for controlling the driving device to drive the first light source, the second light source and the third light source in turn, in response to the mode selecting device selecting the color image forming mode of operation.

According to a second aspect of the present invention, there is provided a data symbol reading device capable of decoding a data symbol and also capable of outputting an image signal corresponding to the data symbol. The data symbol reading device includes an imaging device, an optical system for forming an image of the data symbol on a light receiving surface of the imaging device, and a mode selecting device for selecting a data symbol reading mode in which the data symbol is read, and an image forming mode in which the image signal corresponding to the data symbol is output. The data symbol reading device also includes a light projecting device for selectively projecting a plurality of different colored light beams onto the data symbol, with the light projecting device changing the color of the light in response to the mode selected by the mode selecting device, and a signal processing device for decoding information stored in the data symbol and detected by the imaging device, in response to the data symbol reading mode being selected by the mode selection device, and for generating the image signals, in response to the image forming mode being selected by the mode selection device.

Preferably, the imaging device detects color images and the imaging device is provided with a color filter. Further, the light projecting device is capable of selectively projecting one of white light and monochromatic light.

In the preferred embodiment, the data symbol reading device includes a memory for storing data related to the mode of operation of the data symbol reading device.

Furthermore, the data symbol is a two-dimensional data symbol.

According to a third aspect of the present invention, there is provided a data symbol reading device capable of decoding a data symbol. The data symbol reading device includes an illumination unit for illuminating the data symbol, the illumination unit being capable of illuminating the data symbol with a plurality of different colored light beams, and a reading unit for receiving an image of the illuminated data symbol, the reading unit outputting an image signal The data symbol reading device further includes an operation mode selection switch for selecting one of a plurality of modes of operation of the data symbol reading device and a control unit for controlling the illumination unit to illuminate the data symbol with one of the plurality of light beams in accordance with the mode of operation selected by the mode selection switch.

In one preferred embodiment, the illumination unit includes a white light source and a monochromatic light source, the mode selection switch selecting one of a data symbol reading mode, a monochrome image forming mode and a color image forming mode. The control unit controls the illumination unit to illuminate the data symbol with monochromatic light emitted by the monochromatic light source in response to the mode selection switch selecting the data symbol reading mode. Since the monochromatic light source has low power consumption, the power consumed by the data symbol reading device can be reduced when operating in the data symbol reading mode.

Alternatively, the control unit controls the illumination unit to illuminate the data symbol with white light emitted by the white light source in response to the mode selection switch selecting the color image forming mode.

In a second preferred embodiment, the illumination unit includes a plurality of monochromatic light sources, each of the monochromatic light sources being a different color. In this case, the control unit controls the illumination unit to illuminate the data symbol with monochromatic light emitted by one of the monochromatic light sources in response to the mode selection switch selecting the data symbol reading mode and the monochrome image forming mode. Since the monochromatic light source can include an LED, the power consumption of the data symbol reading device can be reduced when operating in these modes.

Further, the control unit controls the illumination unit to sequentially illuminate the data symbol with monochromatic light emitted by each of the monochromatic light sources in response to the mode selection switch selecting the color image forming mode. Therefore, the number of different types of light sources used in the data symbol reading device can be reduced.

DETAILED DESCRIPTION OF THE PREFERRED EMBODIMENTS

A data symbol reading device according to the present invention will be described with reference to the drawings.

Figure 1:
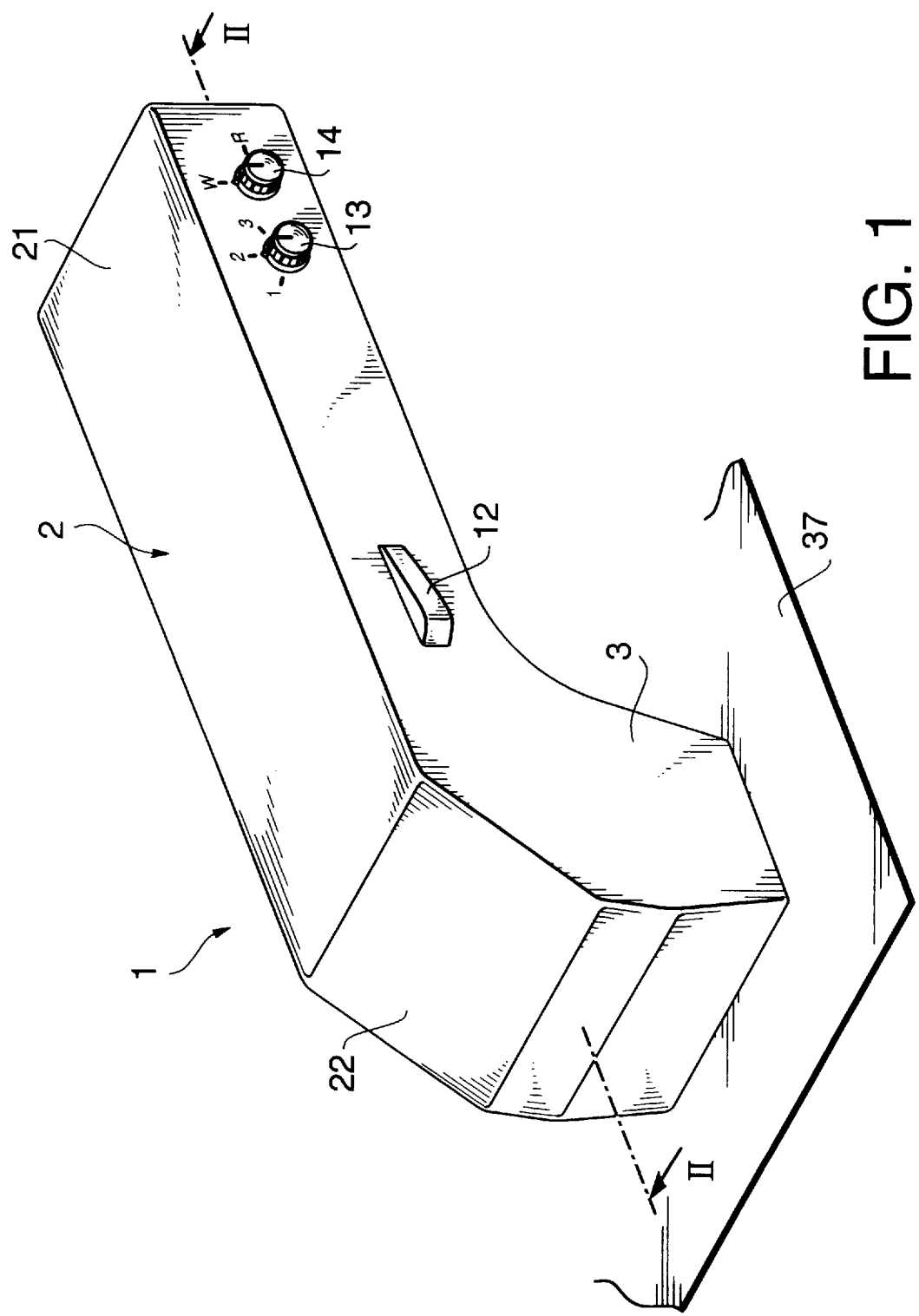
FIG. 1 is a perspective view showing a first preferred embodiment of a data symbol reading device according to the present invention.
Figure 2:
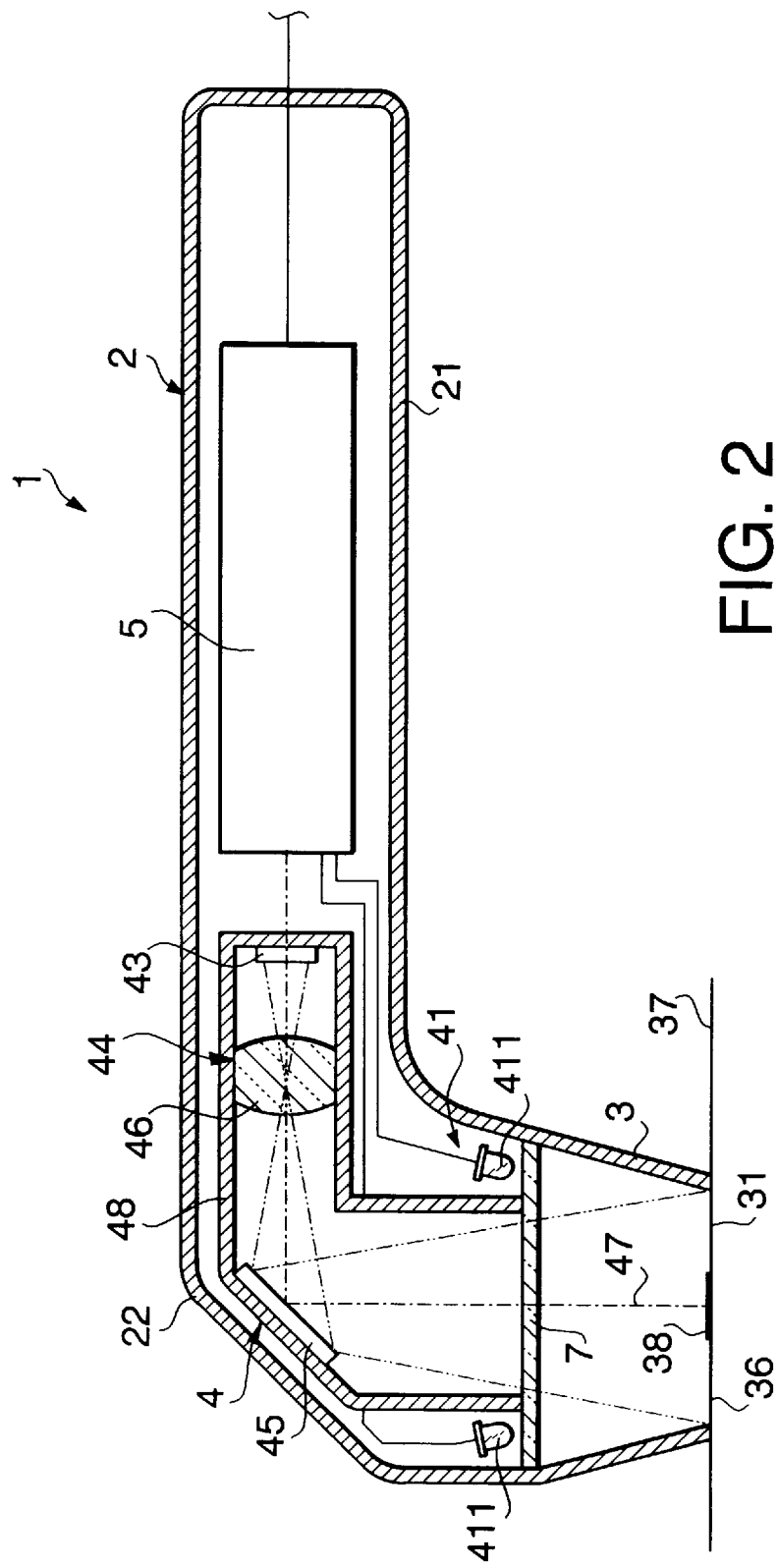
FIG. 2 is a Cross-sectional view of the data symbol reading device shown in FIG. 1.
Figure 3:
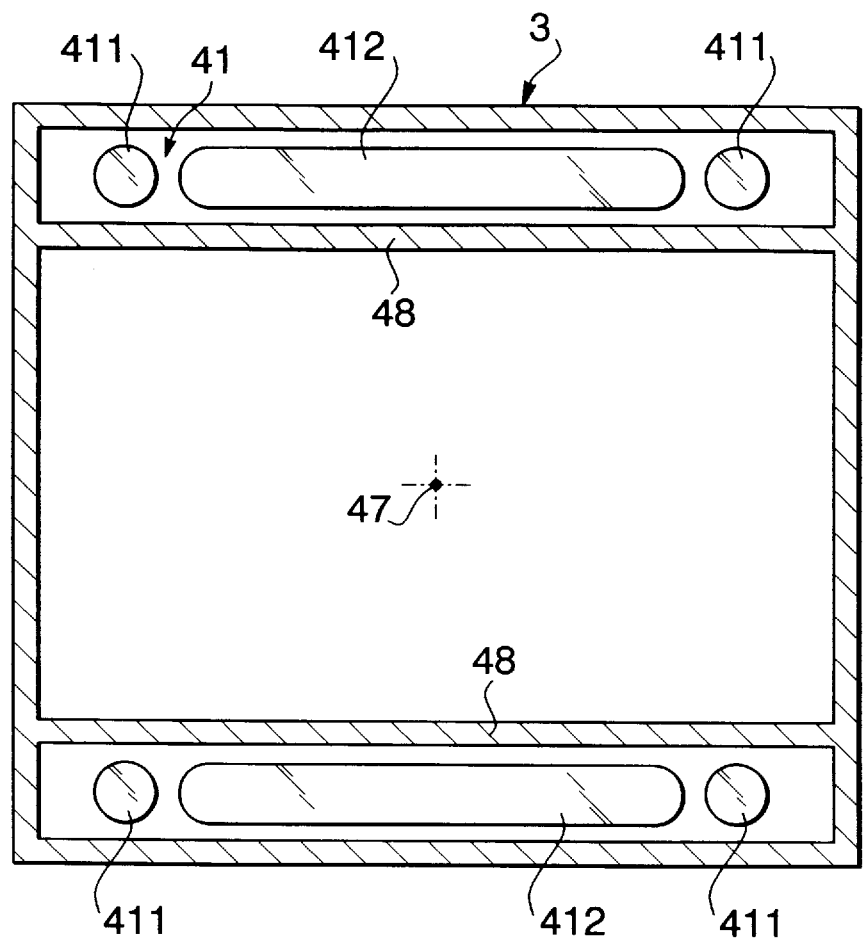
FIG. 3 is a sectional plan view of a housing in the data symbol reading device shown in FIG. 1.
Figure 4:
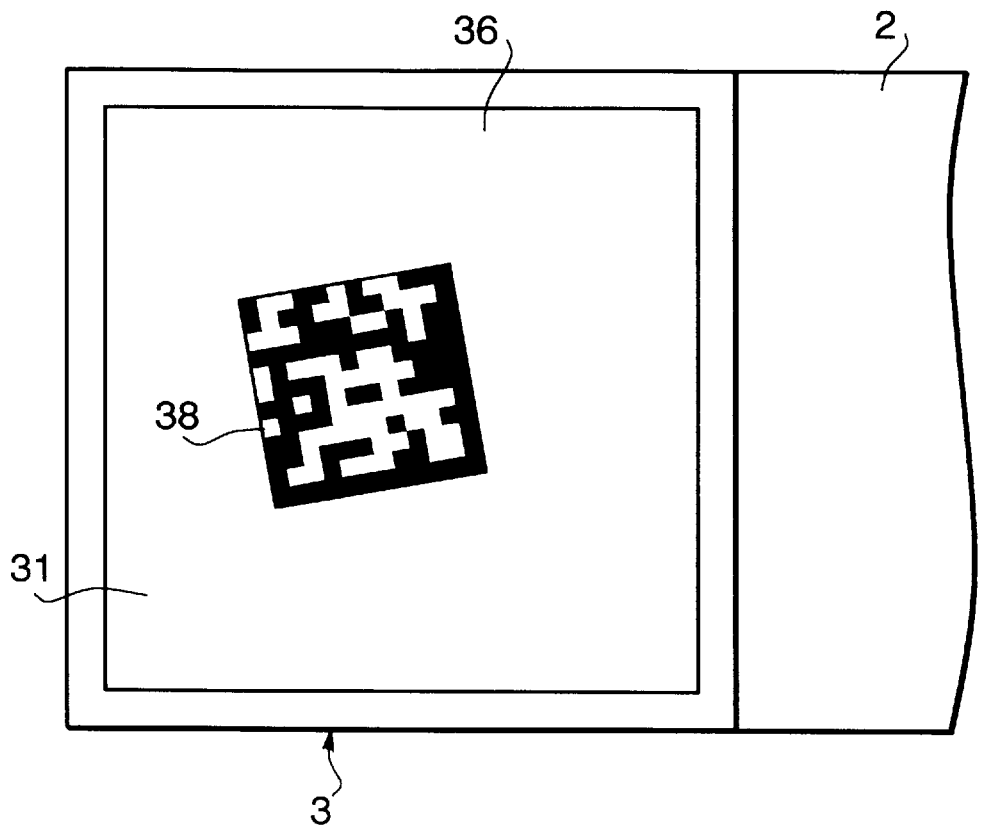
FIG. 4 is a bottom view of a housing in the data symbol reading device shown in FIG. 1.
Figure 5:
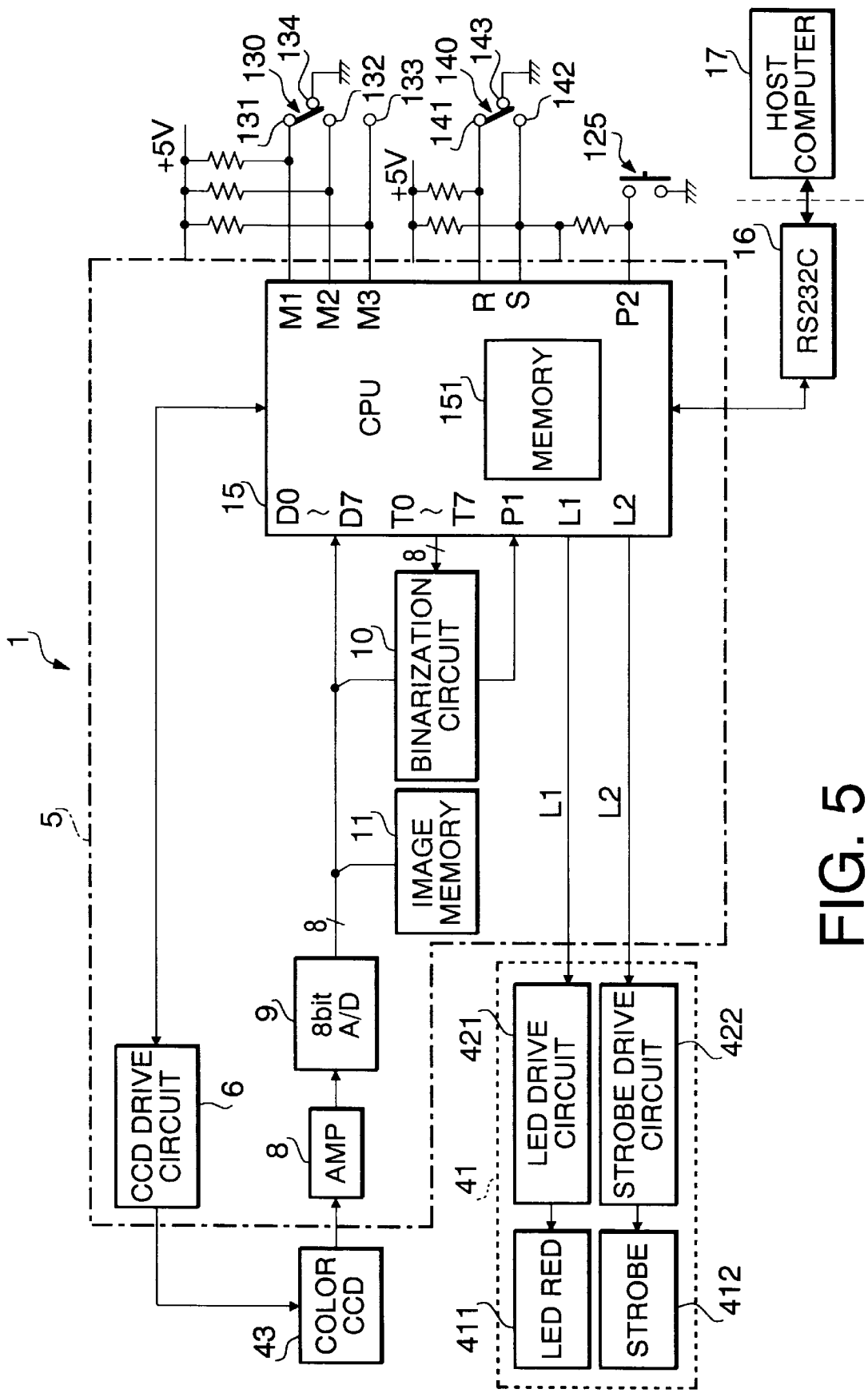
FIG. 5 is a block diagram of the data symbol reading device shown in FIG. 1.

FIG. 1 is a perspective view showing a first preferred embodiment of a data symbol reading device 1 according to the present invention. FIG. 2 is a cross-sectional side view of the data symbol reading device 1 shown in FIG. 1. FIG. 3 is a sectional plan view of the data symbol reading device 1 shown in FIG. 1. FIG. 4 is a bottom view of the data symbol reading device 1 shown in FIG. 1. FIG. 5 is a block diagram showing the circuit configuration of the data symbol reading device 1 shown in FIG. 1.

As shown in FIGS. 1 through 5, the data symbol reading device 1 has an outside case 2. having a handle portion 21 and a reading head portion 22 formed at one end of the handle portion 21. The handle portion 21 encloses a signal processing circuit 5 (described later), an LED driving circuit 421, a strobe driving circuit 422 and a communication driver 16 (e.g., an RS-232C interface). The reading head portion 22 also encloses a reading unit 4 for receiving light from a symbol reading area 36, four red LEDs (light emitting diodes) 411 and two strobe light sources 412, each consisting of a xenon tube.

A trigger button 12, a mode selecting dial 13, and a light source selection dial 14 are positioned at a side of the handle portion 21, as shown in FIG. 1. The trigger button 12 operates a trigger switch 125, the mode selection dial 13 operates a mode selection switch 130, and the light source selection dial 14 operates a light source selection switch 140.

An illumination unit 41 for illuminating the symbol reading area 36 (and therefore a data symbol to be read) includes the abovementioned four red LEDs 411, and two strobe light sources 412, and further includes the LED driving circuit 421 for driving the respective red LEDs 411, and the strobe driving circuit 422 for driving each of the respective strobe light sources 412. The illumination unit 41 permits a plurality of different light beams (in the first embodiment, monochromatic light or white light) to be selectively projected (or radiated) onto a data symbol 38 located in the symbol reading area 36.

The reading unit 4 further includes an imaging device, such as a CCD (charge-coupled device) 43, an optical system 44 and a supporting. member 48 for supporting the CCD 43 and the optical system 44. The optical system 44 converges light reflected by the data symbol 38 positioned in the symbol reading area 36, such that an image of the data symbol 38 is formed on a light receiving plane of the CCD 43.

The optical system 44 consists of a mirror 45 and a lens or lens group 46. The mirror 45 bends a light path 47 of the light reflected from the symbol reading area 36 at a substantially right angle, such that the light is incident on the lens 46. The lens 46 converges the light reflected by the mirror 45 onto a light receiving surface of the CCD 43.

As shown in FIGS. 2 and 3, the red LEDs 411 of the illumination unit 41 are positioned symmetrically about the optical path 47 at four corners of a lower end of the supporting member 48. Furthermore, each strobe light source 412 is positioned between opposite pairs of the red LEDs 411. Thus, the symbol reading area 36 is uniformly illuminated.

A diffusion plate (not shown) may be provided at the light emitting side of the red LED 411 and strobe light source 412 in order to make the light incident on the symbol reading area 36 have more uniform brightness. The diffusion plate may be obtained, for example, by roughening a part of a transparent plate 7, described later.

The CCD 43 consists of a plurality of photodiode picture elements (pixels) arranged in a matrix. A charge is accumlated at each pixel in response to the amount of light (reflected by the data symbol 38) that is incident on the corresponding photodiodes. The accumulated charge at each pixel is transmitted to the signal processing circuit at predetermined time intervals. The transferred electric charge constitutes the image signal of the image of the data symbol 38 read by the data symbol reading device 1.

In the preferred embodiment, the CCD 43 is a color image CCD which has a color filter. In this case, an R/G/B vertical stripe filter is placed on the light receiving plane of the CCD 43 in order to detect the colors Red (R), Green (G), and Blue (B). However, another color filter, such as an Mg/G/Cy/Ye complementary color filter, etc. may be used, in order to detect Magenta (Mg), Green (G), Cyan (Cy) and Yellow (Ye).

The symbol reading area 36 is an area inherent to the data symbol reading device and defines an area of a reading plane 37 which can be read by the CCD 43.

In the preferred embodiment, as shown in FIG. 4, the data symbol 38 is composed of a black and white matrix pattern having X rows of cells by Y columns of cells, where X and Y are integers larger than 1. The black and white cells represent binarized data having values of 0 or 1, respectively. Therefore, information is indicated by different combinations of the black and white cells. Alternatively, combinations of black and transparent cells can be used to indicate the data. In this case the data symbol 38 should be backlit. The periphery of the data symbol 38 is made black in order to facilitate the detection of the edge of the data symbol 38.

In the reading unit 4 constructed above, the LED driving circuit 421 turns the red LEDs 411 ON in order to illuminate the symbol reading area 36. Alternatively, the strobe driving circuit 422 turns the strobe light sources 412 ON in order to illuminate the symbol reading area 36. If the data symbol 38 is positioned within the symbol reading area 36, then light is reflected by the data symbol 38 and an image of the data symbol 38 is formed on the light receiving surface of the CCD 43, by the optical system 44. Then, an image signal (analog signal) is output by the CCD 43 in accordance with the amount of the light received from the optical system 44.

The reading head portion 22 has a light receiving box 3 extending from the reading unit 4 toward the symbol reading area 36. The light receiving box 3 is configured such that when a front opening 31 thereof contacts the symbol reading. surface 47, the reading unit 4 is maintained a predetermined distance from the symbol reading surface 37. This ensures that the optical path length from the data symbol 38 to the CCD 43 remains constant when reading different data symbols. Further, the light receiving box 3 surrounds the optical path 47 such that only the light reflected by the symbol reading surface 37 in the symbol reading area 36 can enter therein.

A transparent plate 7 is located at a lower opening of the support member 48 for preventing dust and other objects from entering a space 4b of the reading head portion 22 from a space 4 in the light receiving box 3. In the preferred embodiment, the transparent plate 7 may be composed of glass or plastic.

A signal processing circuit 5 for processing the image signals output by the reading unit 4 is provided, for example, on a printed circuit substrate, in the handle portion 21. As shown in FIG. 5, the signal processing circuit 5 includes a CCD driving circuit 6, an amplifier (Amp) 8, an A/D converter (8-bit A/D converter) 9, a comparator 10, an image memory 11, and a controller (CPU) 15. Furthermore, the CPU 15 incorporates a memory 151 for storing data (information), etc., described later.

The LED driving circuit 421, the, strobe driving circuit 422, the communication driver 16, the trigger switch 125, a mode selection switch 130, a light source selection switch 140, a power switch (main switch) (not illustrated), etc. are respectively connected to the CPU 15. Furthermore, an LED, LCD (liquid crystal display) or other display such as CRT (not shown), may be connected to the data symbol reading device 1 if necessary.

The data symbol reading device 1 has three modes of operation. Mode 1 is a data symbol reading mode, mode 2 is a color image forming mode and mode 3 is a monochrome image forming mode. In the context of this specification, "monochrome" denotes a black-and-white image having a range of luminance values, or a so-called "grayscale" image.

In mode 1, if the trigger switch 125 is turned ON while power is being supplied to the data symbol reading device 1, then the reading of the data symbol 38 is started, and a predetermined processing of the image data, described later, will be performed by the signal processing circuit 5. The processed image data is decoded and the decoded data is then output by a communication driver 16 to an external host computer 17, such as a personal computer or workstation. The host computer 17 stores the decoded data and can perform other calculations on the decoded data.

If mode 2 or the mode 3 is selected, the image data corresponding to the image detected by the CCD 43 is detected and sent to the host computer 17. The signal processing circuit 5 therefore processes an n-bit image data (8 bits in the preferred embodiment) and outputs the processed image data to the host computer 17 using the communication driver 16. The host computer 17 also outputs the image data to a monitor for displaying the detected image. Further, the image data may be stored on a recording medium, or printed.

Furthermore, in mode 2, color image data, (i.e., red image data, green image data and blue image data) are generated. These image data are output to the host computer 17 as color image data (color image signals).

In mode 3, if light is provided by the red LEDs 411, then only the red image data is generated. Thus, the image data is outputted to the host computer 17 as monochrome image data. However, if light is provided by the strobe light sources 412, then red image data, green image data and blue image data are obtained. In this case, a brightness signal is generated from the three image data, and the brightness signal is output to the host computer 17 as the monochrome image data.

The operation of the data symbol reading device 1 when the various modes (i.e., modes 1, 2 and 3) are selected will be described with reference to FIG. 5.

The CPU 15 has two groups of ports which are used to select one of the modes of operation, and the light source. Parts M1, M2 and M3 of the CPU 15 are electrically connected to terminals 131, 132 and 133, respectively, of the mode selection switch 130. A terminal 134 of the made selection switch 130 is electrically connected to ground. By operating a dial 13, a wiper electrically connected to the terminal 134, is moved to contact one of the terminals 131, 132 and 133, thereby grounding the contacted terminal. The ports M1, M2 and M3 are normally tied high (to +5 V) through resistors, but by grounding one of the terminals 131, 132 or 133, the mode selection switch 130 will ground the respective port M1, M2 or M3. The grounding of one of the ports M1, M2 and M3 is detected by the CPU 15, which selects the mode 1, the mode 2 or the mode 3, respectively.

The ports R and S of the CPU 15 are electrically connected to terminals 141 and 142, respectively, of the light source selection switch 140. A terminal 143 of the light source selection switch 140 is electrically connected to ground. By operating the dial 14, a wiper electrically connected to the terminal 143, is moved to contact one of the terminals 141 and 142, thereby grounding the contacted terminal. The ports R and S are normally tied high (to +5 V) through resistors, but by grounding one of the terminals 141 or 142, the light source selection switch 140 will ground the respective port R or S. The grounding of one of the ports R and S is detected by the CPU 15, which selects the Red LED 411 or the strobe 412.

Table 1 below is a truth table for the respective modes of operation and light sources.

TABLE 1

| | SWITCH 130 | | | SWITCH 140 | | LEDS 411 | STROBE 412 |
|---|---|---|---|---|---|---|---|
| PORT | M1 | M2 | M3 | R | S | L1 | L2 |
| MODE 1 | 0 | 1 | 1 | — | — | ON | OFF |
| MODE 2 | 1 | 0 | 1 | — | — | OFF | ON |
| MODE 3 | 1 | 1 | 0 | 0 | 1 | ON | OFF |
| | 1 | 1 | 0 | 1 | 0 | OFF | ON |

As shown in the above truth table, when mode 1 is selected, a port L1 of the CPU 15 controls the LED drive circuit 421 to drive the red LEDs 411, thereby emitting red light onto the symbol reading area 36. In this case, the setting of the light source selection switch 140 is not considered.

Similarly, when mode 2 is selected, a port L2 of the CPU 15 controls the strobe drive circuit 422 to drive the strobe 412, thereby emitting white light onto the symbol reading area 36. In this case, the setting of the light source selection switch 140 is not considered.

When mode 3 is selected, if the light source selection switch 140 selects the red LEDs 411 (i.e., R=0, S=1), then the port L1 of the CPU 15 controls the LED drive circuit 421 to drive the red LEDs 411, thereby emitting red light onto the symbol reading area 36. Conversely, when mode 3 is selected, if the light source selection switch 140 selects the strobe light sources 412 (i.e., R=1, S=0), then the port L2 of the CPU 15 controls the strobe drive circuit 422 to drive the strobe light sources 412, thereby emitting white light onto the symbol reading area 36.

Therefore, the mode selection dial 13, the mode selection switch 130 and the CPU 15 are used to select between modes 1 or modes 2 and 3. Further, the light source selection dial 14, the light source selection switch 140 and the CPU 15 are used to select between modes 2 and 3.

The operation of mode 1 (i.e., the data symbol reading mode) of the data symbol reading device 1 will be described below.

Initially, a power switch turned is ON, in order to supply power to the data symbol reading device 1 from an external power supply (not shown). When the power switch is turned ON, the CPU 15 applies power to the remaining circuitry of the data symbol reading device 1. In the preferred embodiment, the CPU 15 is always operating when the data symbol reading device 1 is connected to the external power supply.

When the data symbol 38 is to be read, an operator presses the trigger button 12. The pressing of the trigger button 12 turns the switch 125 ON, which is sensed by the CPU 15.

The CPU 15 controls the LED drive circuit 421 to drive the red LEDs 411 for a predetermined time interval in order to illuminate the symbol reading area 36, in response to the pressing of the trigger button 12. The CPU 15 also controls the CCD driving circuit 6 to drive the CCD 43, thereby scanning the symbol reading area 36. Thus, the CCD 43 scans the symbol reading area 36 two-dimensionally, and the accumulated charge is transferred under the control of the CCD driving circuit 6. Further, the CCD driving circuit 6 generates a compound clock signal by combining the horizontal synchronous signal and vertical synchronous signal. The combined clock signal is then output to the CPU 15.

Initially, the CCD 43 receives image data corresponding to the entire symbol reading area 36. Thus, this image data is processed using edge detection, etc., in order to separate the image data corresponding to the data symbol 38 from the rest of the image data. If there is a data symbol in the symbol reading area 36, then the CCD 43 will but put an analog image signal corresponding to the received data symbol image. The output analog image signal is amplified by the amplifier 8, and converted to 8-bit image data by the A/D converter 9. In this case, only the red image signal read out of the CCD 43 is processed The 8-bit image data is stored in an image memory 11. The image memory 11 can store one frame of the 8-bit image data.

The comparator 10 then compares the image data read out of the image memory 11 with 8-bit threshold data stored in a portion A of an internal memory 151 of the CPU 15. The comparator 10 then outputs binarized data to the CPU 15 which stores the binarized data in a portion B of the internal memory 151 at an address determined by an address counter of the CPU 15. The address counter is driven by the compound clock signal, which is input from the CCD driving circuit 6. The data is then sequentially read out from the portion B of the internal memory 151 in accordance with the addresses output from the address counter. The data may also be read out in a reverse order from the order that it was stored in the memory 12 by reversing the designated addresses.

The read out data is then processed frame by frame by the calculating portion of the CPU 15. The CPU 15 can perform image inversion, drop correction and image rotation. The CPU 15 also decodes the data and outputs the decoded data to a host computer or work station 17 via the communication driver 16.

Figure 6A:
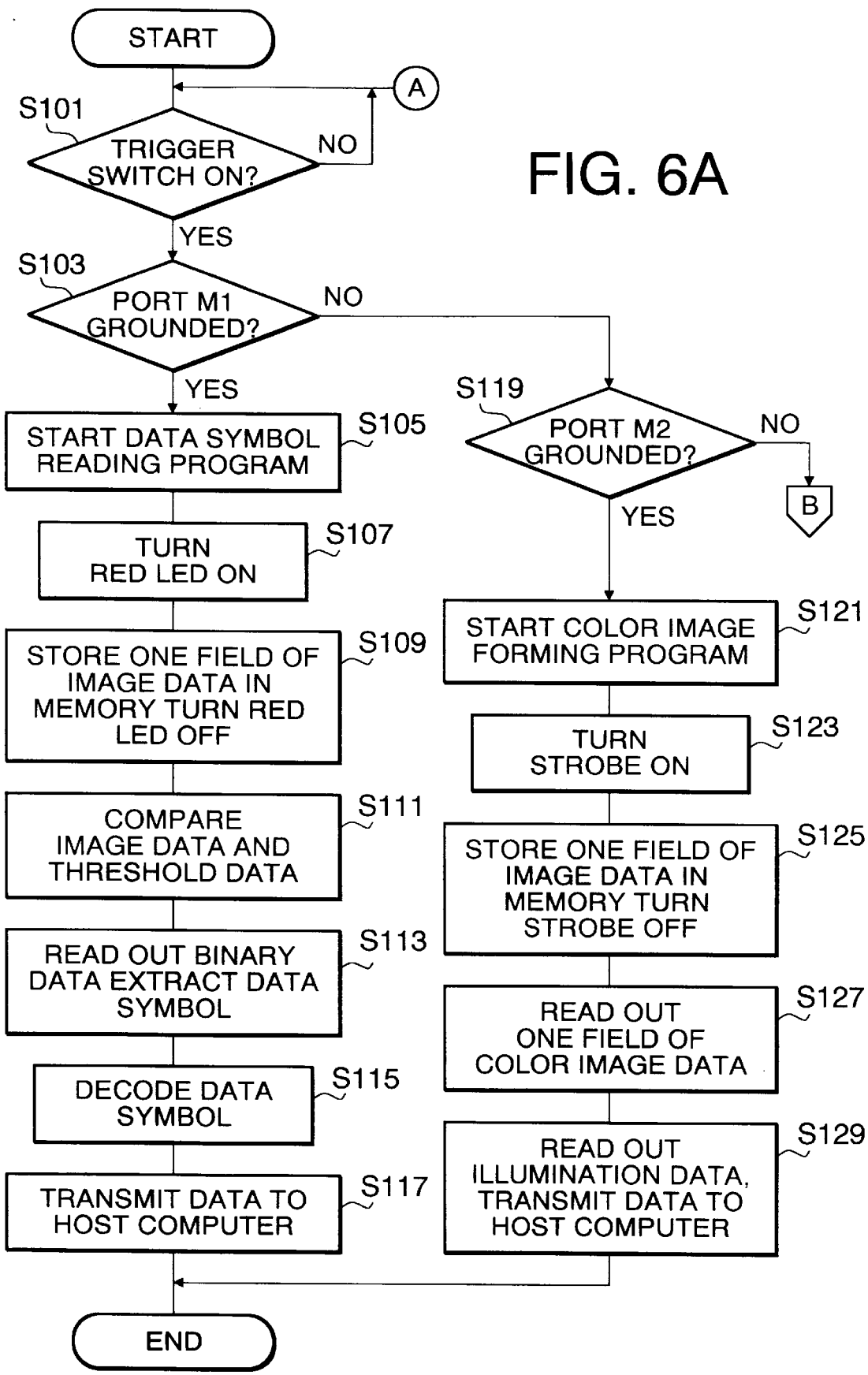
FIGS. 6A and 6B show a flow chart of an operation of the data symbol reading device shown in FIG. 1.
Figure 6B:
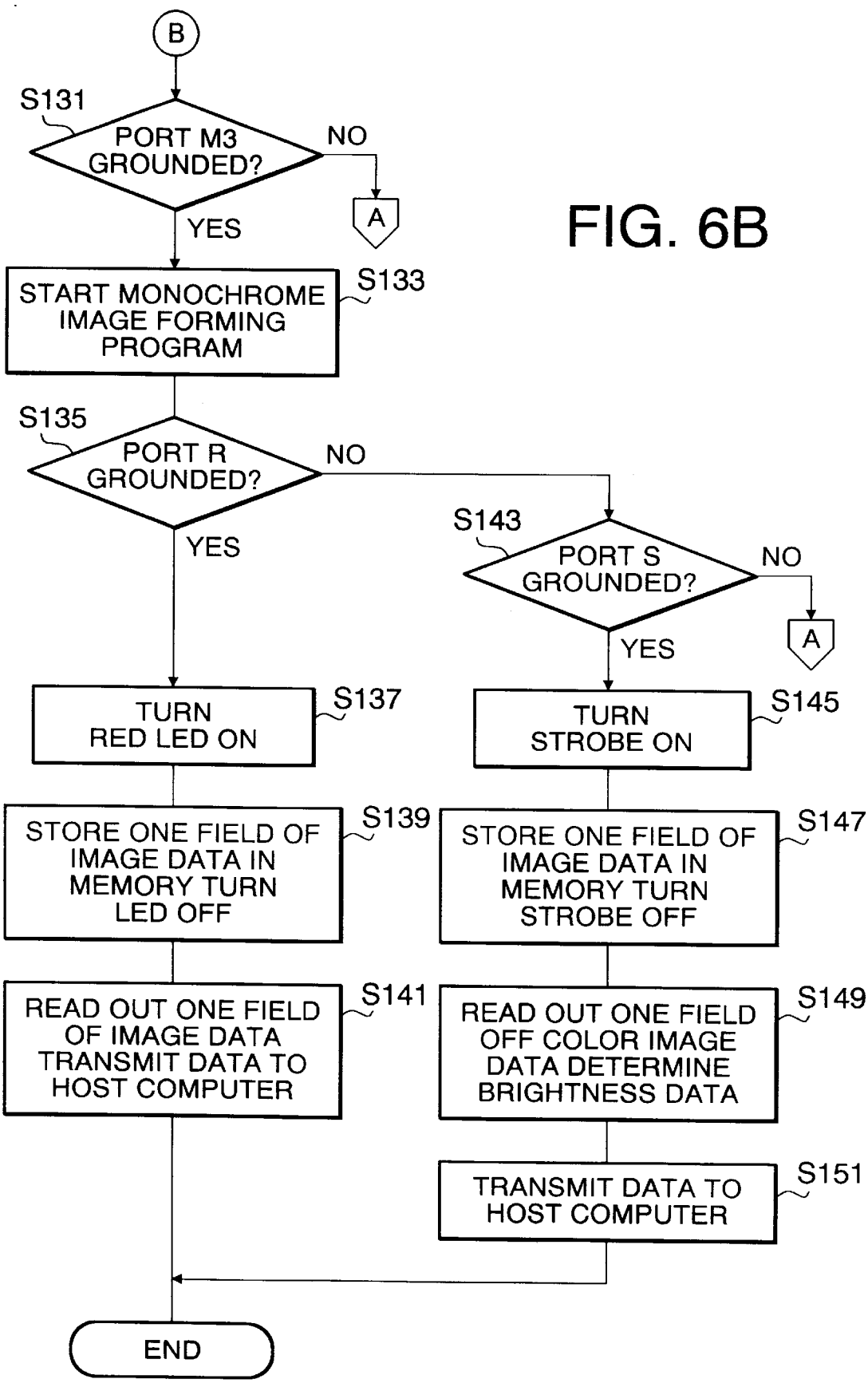

FIG. 6 shows a flow chart of an operation of the CPU 15 of data symbol reading device 1 according to a first embodiment of the present invention.

Initially, step S101 determines whether the trigger switch 125 is turned ON. If the trigger switch 125 is turned ON (S101:Y), then step S103 determines whether port M1 is grounded (i.e., port M1 is LOW as a result of mode 1 being selected). Otherwise (S101:N), step S101 is repeated.

If port M1 is grounded (S103:Y), then a data Symbol reading program stared in an internal ROM of the CPU 15 is started, in step S105. Then in step S107, the CPU 15 controls the LED drive circuit 421 to turn the Red LEDs 411 ON. Simultaneously, the CCD drive circuit 6 controls the CCD 43 to start detecting the image data.

In step S109, one field of image data detected by the CCD 43 is stored in the image memory 11. In the preferred embodiment, since the illumination light is a single color (i.e., red), the image data detected by the CCD 43 and output by the CCD drive circuit 6 is the Red image data. After the image data is written in the image memory 11, the red LEDs 411 is turned OFF by the LED driving circuit 421.

Then, in step S111, the comparator 10 compares the image data with the threshold data, in order to obtain binarized data equivalent to one field of image data. The binarized data is then written in the portion B of the internal memory 151 of the CPU 15.

In step S113, the binarized data is read out from the portion B of the internal memory 151. The binarized data corresponding to the image portion contained within the edge (black periphery) of the data symbol 38 is recognized as the image that is to be decoded. This increases the speed of decoding the data symbol since the extraction of the image data is done by first detecting a black boundary and then extracting the (binarized) image data contained within the black boundary.

Step S115 then decodes the extracted image data using the image processes mentioned above. The decoded data and the mode data are then transmitted to the host computer 17 via the communication driver 16, in step S117. The routine then ends.

However, if mode 1 was not selected, and therefore the port M1 was not grounded (S103:N), step S119 determines whether port M2 is grounded (i.e., port M2 is LOW as a result of mode 2 being selected).

If the port M2 is grounded (S119:Y), then, a color imaging forming program is started in step S121. Then, in step S123, the CPU 15 controls the strobe driving circuit 422 to turn the strobe 412 ON. Simultaneously, the CCD drive circuit 6 controls the CCD 43 to start detecting the image data.

In step S125, one field of image data detected by the CCD 43 is stored in the image memory 11. In this case, since the illumination light is not a single color, then the image data detected by the CCD 43 and output by the CCD drive circuit 6 includes the red image data, the green image data and the blue image data. After the image data is written in the image memory 11, the strobe 412 is turned OFF by the strobe driving circuit 422.

Then in step S127, the color image data is read out from the image memory 11. In step S129, the illumination data is read out from a portion C of the internal memory 151 of the CPU 15, and then the illumination data, the color image data and the mode data (data for selecting mode 2) are transmitted to the host computer 17 via the communication driver 16 in step S129.

The illumination data includes data such as the wavelength, the light intensity (i.e., brightness) and the color temperature of the illuminating light. This data is stored in the portion C of the memory 151. The illumination data is used to adjust the white balance and the amplification of the red image signal, the green image signal and the blue image signal. Further, the illumination data is also used to determine the processing for adequate color regeneration, etc., such that the color of the image that is output on a display or printer approaches the color of the actual image.

In case that neither the port M1 nor the port M2 is grounded (S103:N, S119:N), then step S131 determines whether port M3 is grounded. If port M3 is not grounded (S131:N), control returns to step S101.

If port M3 is grounded (S131:Y), then a monochrome imaging forming program is started in step S121. Then, step S135 determines whether the light source selection switch 140 has selected the Red LEDs 411 as the light source, by checking whether port R of the CPU 15 is grounded (i.e., made LOW). If the port R is grounded (S135:Y), then the CPU 15 controls the LED drive circuit 411 to turn the Red LEDs 411 ON.

In step S139, one field of image data detected by the CCD 43 is stored in the image memory 11. Since the illumination light is a single color (i.e., red), the image data detected by the CCD 43 and output by the CCD drive circuit 6 is the red image data. After the image data is written in the image memory 11, the red LEDs 411 is turned OFF by the LED driving circuit 421.

Then, in step S141, the image data is read out from the image memory 11, and the image data and the mode data (data for selecting mode 2) are transmitted to the host computer 17, via the communication driver 16, as monochrome image data.

However, if port R is not grounded (S135:N), then step S143 determines whether port S is grounded (i.e., made LOW). If the port S is not grounded (S143:N), then control returns to step S101.

Otherwise (S143:Y), the CPU 15 controls the strobe driving circuit 422 to turn the strobe 412 ON, in step S145. Simultaneously, the CCD drive circuit 6 controls the CCD 43 to start detecting the image data.

In step S147, one field of image data detected by the CCD 43 is stored in the image memory 11. In this case, since illumination light is not a single color, then the image data detected by the CCD 43 and output by the CCD drive circuit 6 includes the red image data, the green image data and the blue image data. After the image data is written in the image memory 11, the strobe 412 is turned OFF by the strobe driving circuit 422.

Then in step S149, the color image data is read out from the image memory 11, and a brightness signal is determined in accordance with the red, green and blue image data. The brightness signal is then transmitted to the host computer 17 via the communication driver 16, in step S151, and the routine ends.

Thus, the data symbol reading device 1 according to the first embodiment can read and decode the data symbol 38, as well as transmit either a monochrome image or a color image of the data symbol 38 to an external computer.

Furthermore, since the data symbol reading device 1 has a color image forming mode and a monochrome image forming mode, either the color image data or the monochrome image data can be selected and generated as required. This enhances the versatility of the data symbol reading device 1.

Further, in mode 1, (i.e., the data symbol reading mode) the light source can be one or more LED's, and therefore, the power consumption of the data symbol reading device 1 can be reduced in this mode, compared with a data symbol reading device which uses a white light source.

Furthermore, in mode 2 (i.e., the monochrome image forming mode) it is possible to use a single color light source (i.e. , the LED 411), thereby reducing the power consumption of the data Symbol reading device 1 when forming the monochrome image.

Still further, in the first preferred embodiment, a illumination unit 41 is not limited to the configuration shown in the drawing. It may be such that a single color light or white color is able to be selectively projected. However, the data symbol reading device should be configured such that no peripheral light is exposed onto the data symbol while the image of the data symbol is being detected by the CCD.

Hereinafter, a description will be given of other configurations of the illumination unit 41.

Figure 7:
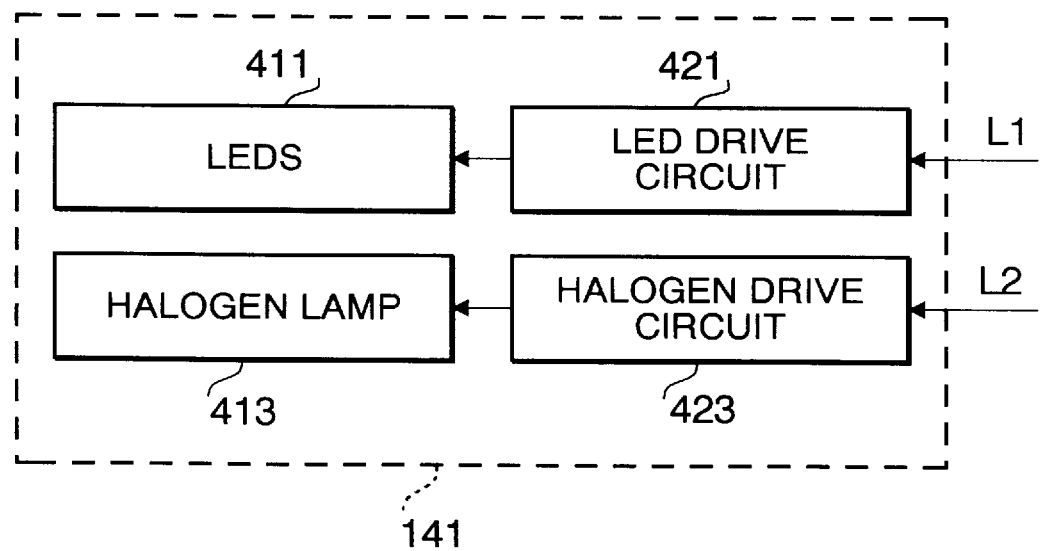
FIG. 7 is a block diagram showing another example of an illumination unit used in the data symbol reading device shown in FIG. 1.

FIG. 7 is a block diagram showing another illumination unit 141. The illumination unit 141 is similar to the illumination unit 41 shown in FIG. 5 with the common elements having the same reference numerals.

As shown in FIG. 7, the illumination unit 141 includes 2 halogen lamp 413, and a halogen lamp driving circuit 423 which drives the halogen lamp 413. The LED driving circuit 421 and the halogen lamp driving circuit 423 are controlled by the CPU 15. in the illumination unit 141, the CPU 15 controls the LED driving circuit 421 to drive the red LEDs 411 to emit red light (single color light) onto the symbol reading area 36. Further, the CPU 15 controls the halogen lamp driving circuit 423 to drive the halogen lamp 413 to emit white light onto the symbol reading area 36.

In the first preferred embodiment, the light source for emitting the single color light of the illumination unit 41 is not limited to the red LEDs 411, but may include a green LED or a blue LED.

Furthermore, in the first preferred embodiment, a light source which emits white light of the illumination unit 41 is not limited to the strobe light source 412 nor the halogen lamp 413, but may include for example, three LEDs (i.e., red, green and blue) which are lit simultaneously, thereby illuminating the symbol reading area 36 with white light.

Figure 8:
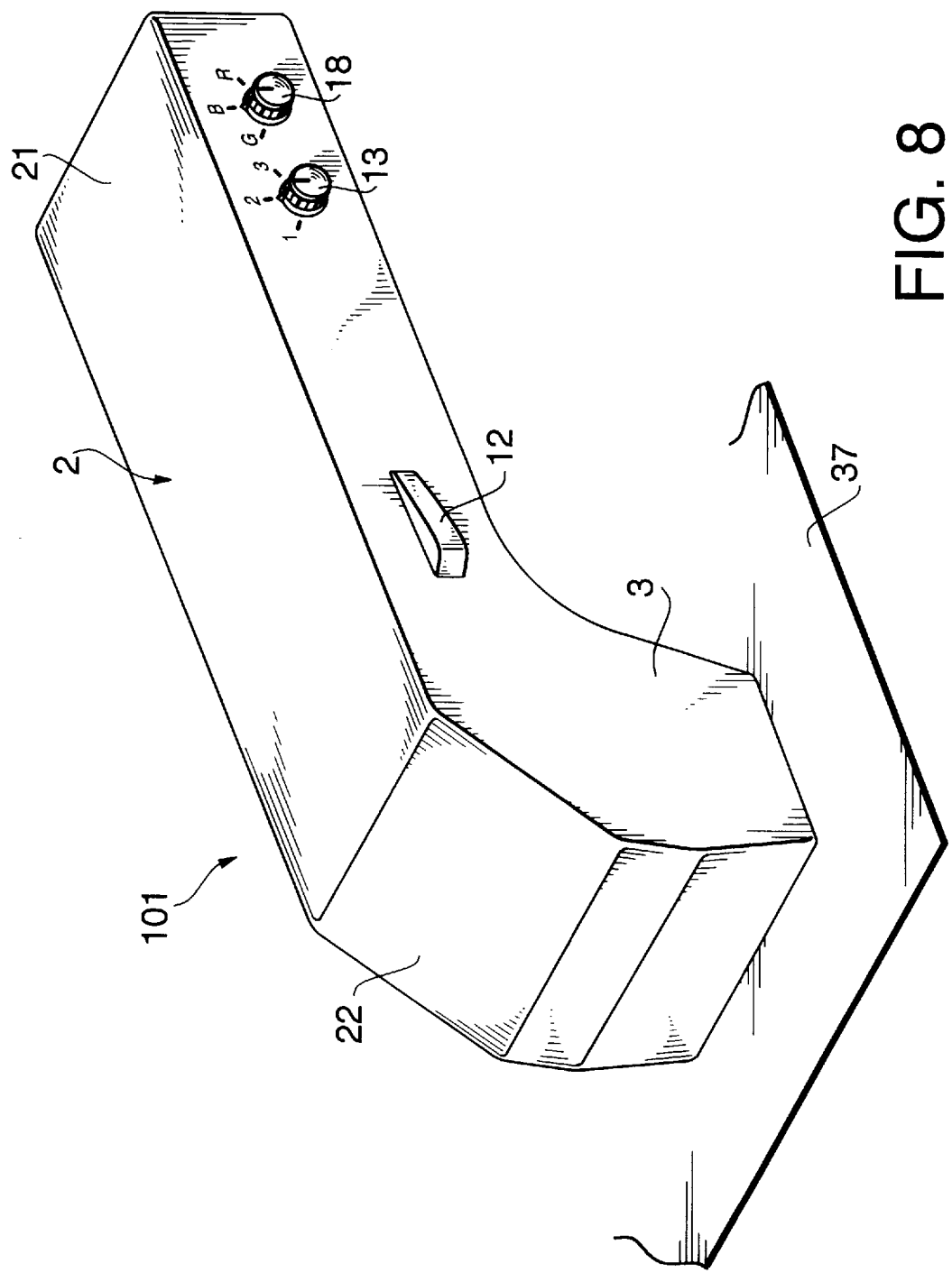
FIG. 8 is a perspective view showing a second preferred embodiment of a data symbol reading device according to the present invention.

FIG. 8 shows a perspective view of a data symbol reading device 101 according to a second embodiment of the present invention. The data symbol reading device 101 is similar to the data symbol reading device 1 of the first embodiment described above, with the common elects having the same reference numerals.

As shown in FIG. 8, the data symbol reading device 101 includes a light source selection switch 18 which is used to select one of three colored light sources.

Figure 9:
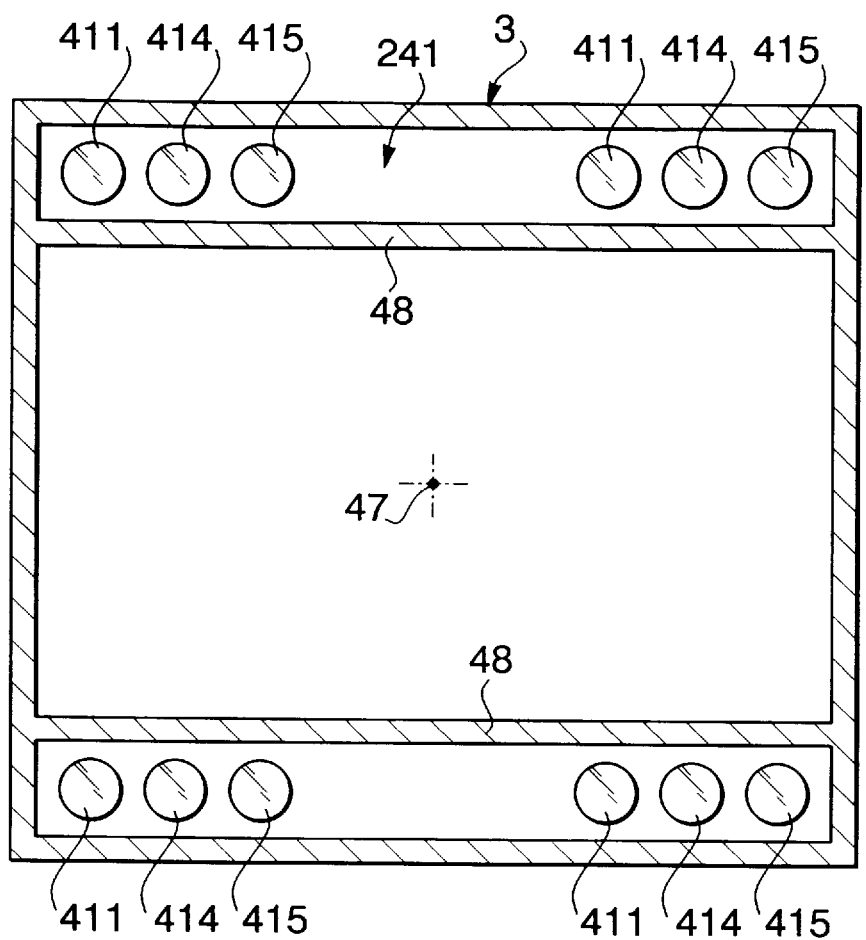
FIG. 9 is a cross-sectional view of a housing in the data symbol reading device shown in FIG. 8.

FIG. 9 is a bottom view of the reading portion 22 of the data symbol reading device 101. As shown in FIG. 9, the symbol reading device 101 including a CPU 115, and a signal processing circuit 105, in addition to an illumination unit 241 and the CCD 143.

The CPU 115 is similar to the CPU 15 described above, with the CPU 115 having two groups of ports. One group of ports is used to select the mode of operation, in a similar manner to that described for the CPU 15 of the first embodiment. Thus, in the data symbol reading device 101, the mode 1, the mode 2 or the mode 3 can be selected using the mode selection dial 13 and the mode selection switch 130.

The second group: of ports is used to select the light source. More specifically, the second group of ports includes the ports R, G and B.

The ports R, G and B of the CPU 115 are electrically connected to terminals 181, 182 and 183, respectively, of the mode selection switch 180. A terminal 184 of the mode selection switch 180 is electrically connected to ground. By operating the dial 18, a wiper electrically connected to the terminal 184, is moved to contact one of the terminals 181, 182 and 183, thereby grounding the contacted terminal. The ports R, G and B are normally tied high (to +5 V) through resistors, but by grounding one of the terminals 181, 182 or 183, the mode selection switch 180 will ground the respective port R, G or B. The grounding of one of the ports R, G and B is detected by the CPU 115, which controls the light driving circuit 424 to drive the red LEDs 411, the green LEDs 414, and the blue LEDs, respectively.

Table 2 below is a truth table in the respective modes.

TABLE 2

| PORT | SWITCH 130 | | | SWITCH 140 | | | RED LED | GREEN LED | BLUE LED |
|---|---|---|---|---|---|---|---|---|---|
|  | M1 | M2 | M3 | R | G | B | L1 | L2 | L3 |
| MODE 1 | 0 | 1 | 1 | 0 | 1 | 1 | ON | OFF | OFF |
|  | 0 | 1 | 1 | 1 | 0 | 1 | OFF | ON | OFF |
|  | 0 | 1 | 1 | 1 | 1 | 0 | OFF | OFF | ON |
| MODE 2 | 1 | 0 | 1 | — | — | — | 1ST ON | 2ND ON | 3RD ON |
| MODE 3 | 1 | 1 | 0 | 0 | 1 |  | ON | OFF | OFF |
|  | 1 | 1 | 0 | 1 | 0 |  | OFF | ON | OFF |
|  | 1 | 1 | 0 | 1 | 0 |  | OFF | OFF | ON | reading head portion 22 includes an illumination unit 241 which has four groups of LEDs. Each group of LEDs includes a red LED 411, a green LED 414, and a blue LED 415. Each of the red LEDs 411 of the illumination unit 241 is installed almost metrically, about the optical path 47 at the four corners of the lower end side of the supporting member 48. Further, each of the green LEDs 414 is installed next to the respective red LEDs 411, and each of the blue LEDs 415 is installed next to the respective green LEDs 414. By using a diffusion plate (not shown) the symbol reading area 36 is illuminated evenly. Further, the data symbol reading device 101 includes an LED driving circuit 424 for driving the LEDs 411, 414 and 415. Thus, the illumination unit 241 can illuminate the data symbol reading area 36 with a plurality of different colored light.

Figure 10:
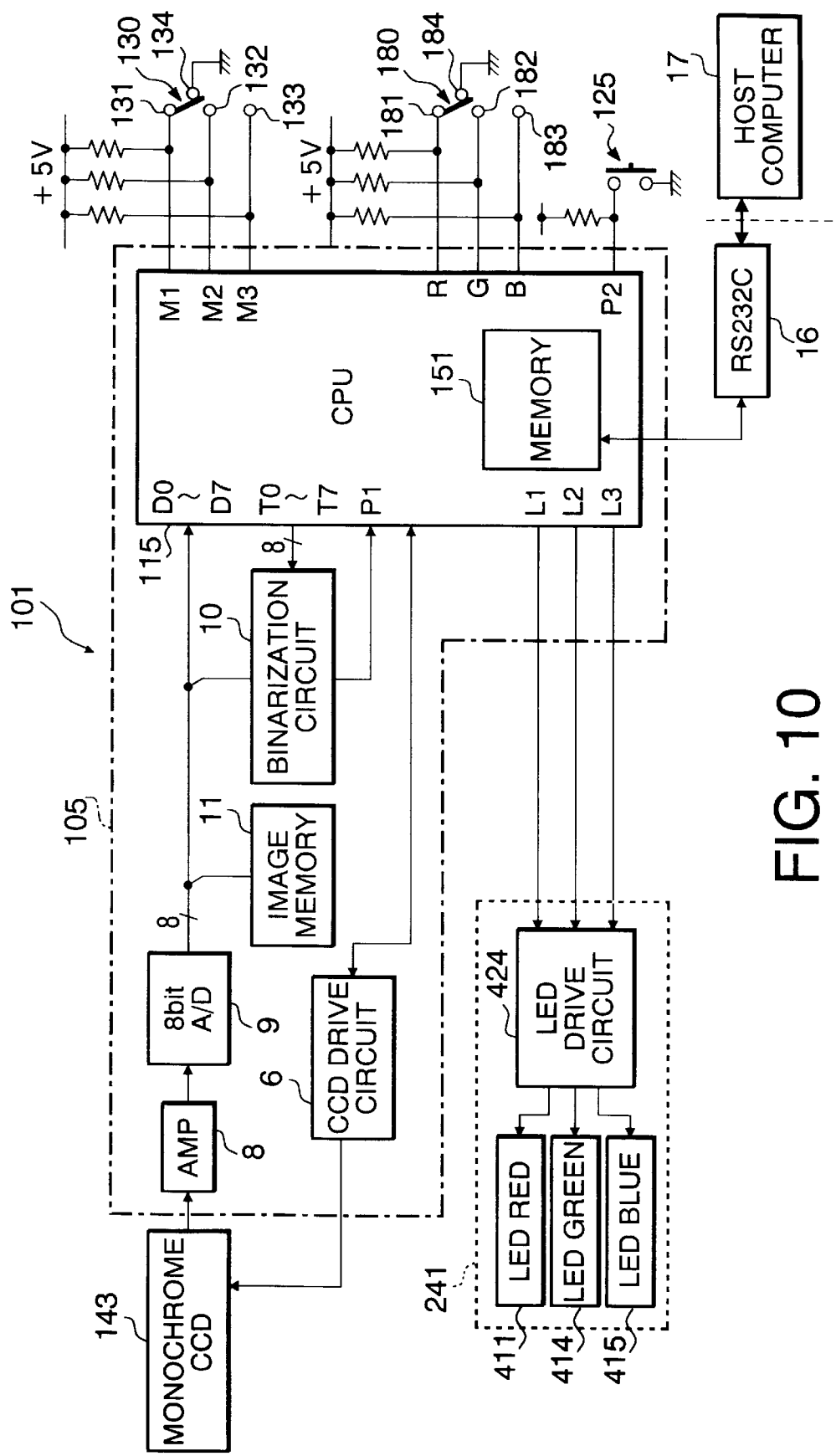
FIG. 10 is a block diagram of the data symbol reading device shown in FIG. 8.

FIG. 10 shows a block diagram of the data symbol reading device 101 shown in FIG. 8

The reading unit 4 consists of a CCD 143 which detects monochrome light, reflected by the data symbol 38, via the optical system 44. Furthermore, in the second embodiment, the CCD 143 is used without a color filter.

As shown in FIG. 10, the data symbol reading device 101 is similar to the data symbol reading device 1, the data As shown in the above truth table, when mode 1 (i.e., port M1=0, port M2=1, and port M3=1) is selected, if the light source selection switch 180 selects the red LED light source (i.e., R=0, G=1, B=1), then the port L1 of the CPU 115 controls the LED drive circuit 424 to drive the red LEDs 411, thereby emitting red light onto the symbol reading area 36. Alternatively, if the light source selection switch 180 selects the green LED light source (i.e., R=1, G=0, B=1), then the port L2 of the CPU 115 controls the LED drive circuit 424 to drive the green LEDs 414, thereby emitting green light onto the symbol reading area 36. Similarly, if the light source selection switch 180 selects the blue LED light source (i.e., R=1, G=1, B=0), then port L3 of the CPU 115 controls the LED drive circuit 424 to drive the blue LEDs 415, thereby emitting blue light onto the symbol reading area 36.

Further, when mode 2 (i.e., port M1=1, port M2=0, and port M3=1) is selected, the setting of the light source selection switch 180 is not considered. In this case ports L1, L2 and L3 of the CPU 115 control the LED drive circuit 424 to drive the red LEDS 411, the green LEDs 414 and the blue LEDs 415, individually in turn. When each LED is driven, the CCD 143 detects the image of the data symbol 38 formed using the single color light, and the CCD driving circuit 6 outputs the image signal to the CPU 115, in order to form a color image.

When mode 3 is selected (i.e., port M1=1, port M2=1, and port M3=0) the ports L1, L2 and L3 drive the LED driving circuit 424 in a similar manner as described for mode M1. However, in mode 3, the CCD 143 detects the image of the data. symbol 38, and the CCD driving circuit outputs the image signal to the CPU 115. Further, in mode 3, the data symbol 38 is not decoded.

Figure 11A:
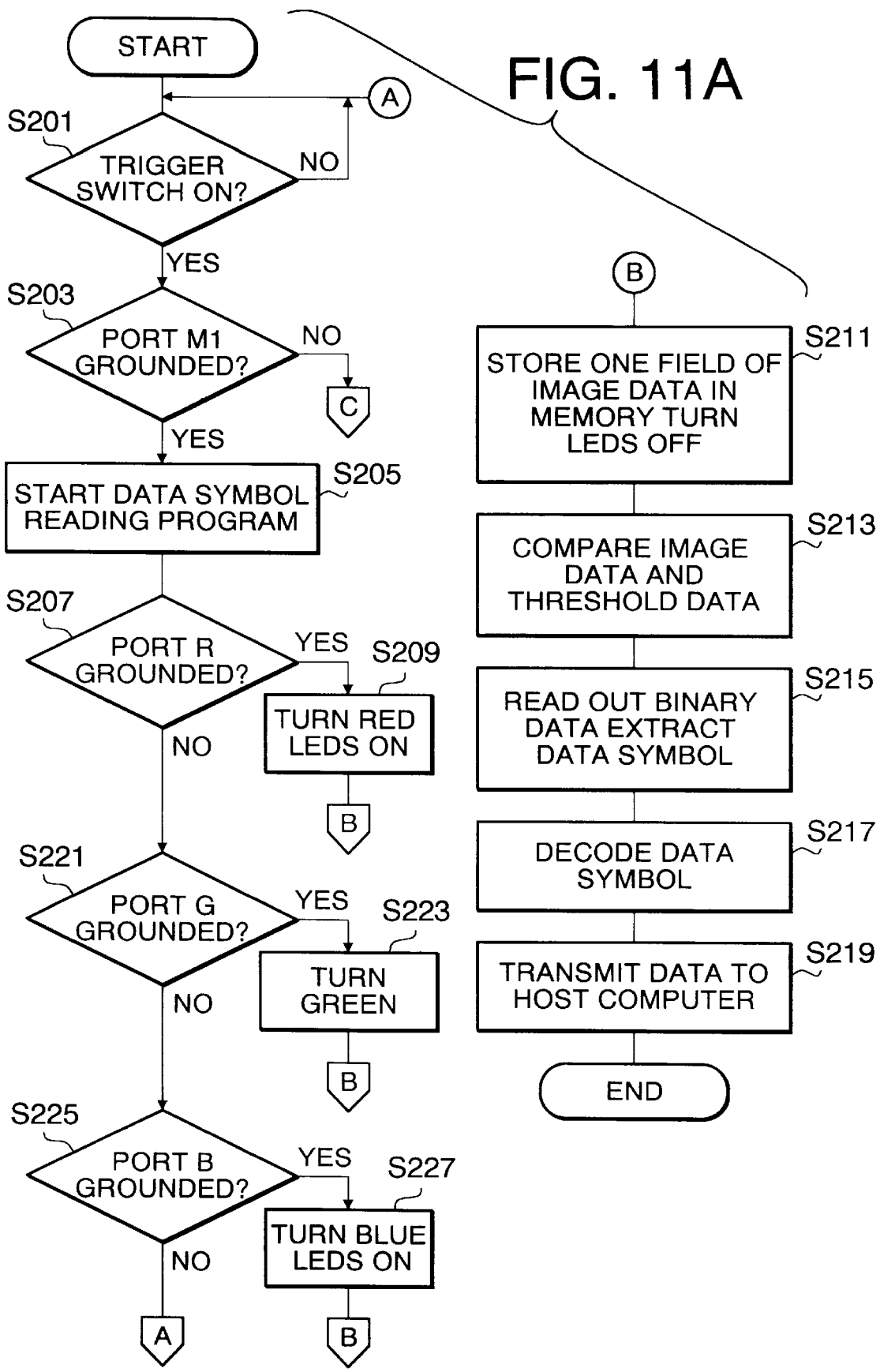
FIGS. 11A through 11C are flow charts of an operation of the data symbol reading device shown in FIG. 8.
Figure 11B:
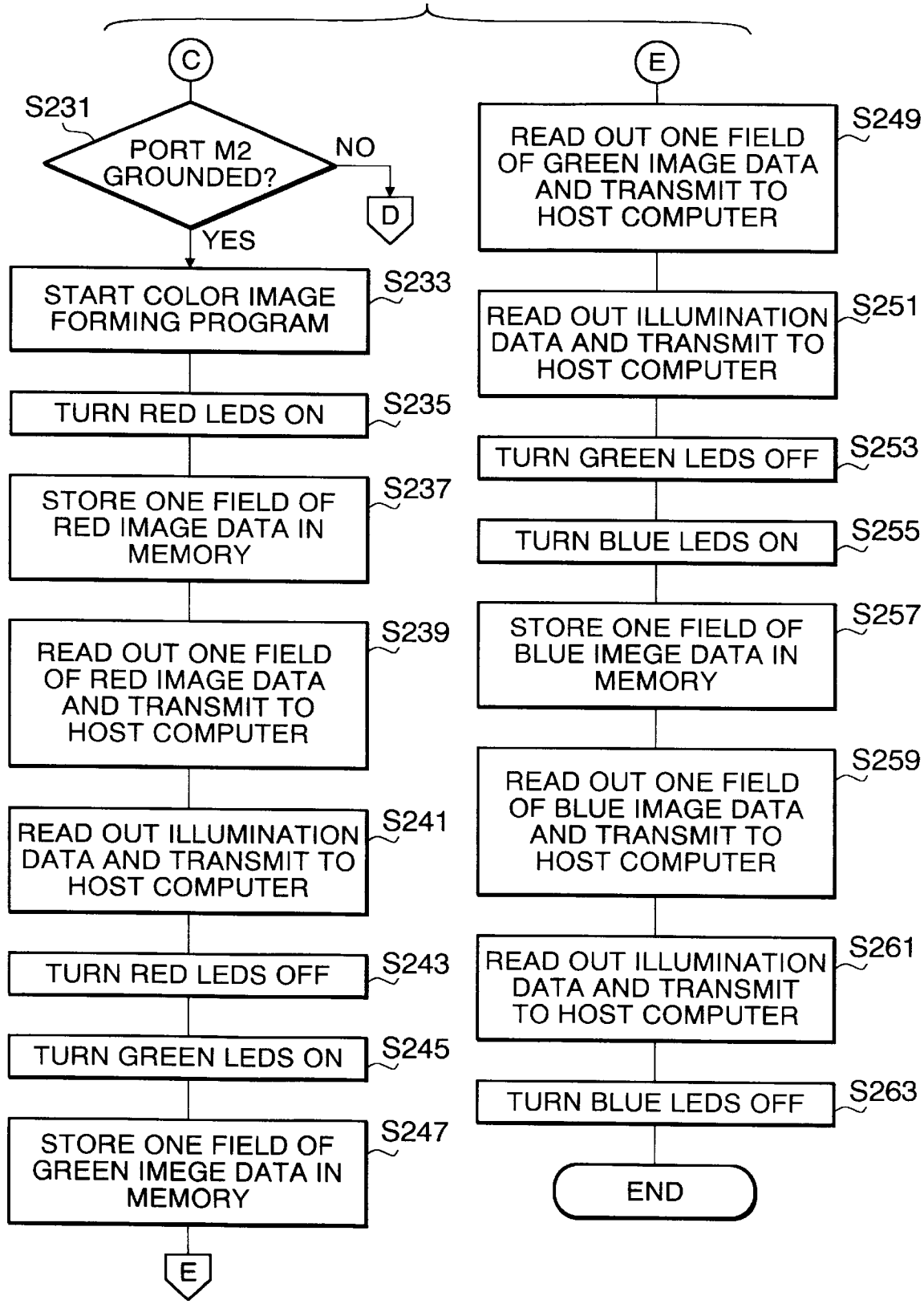
Figure 11C:
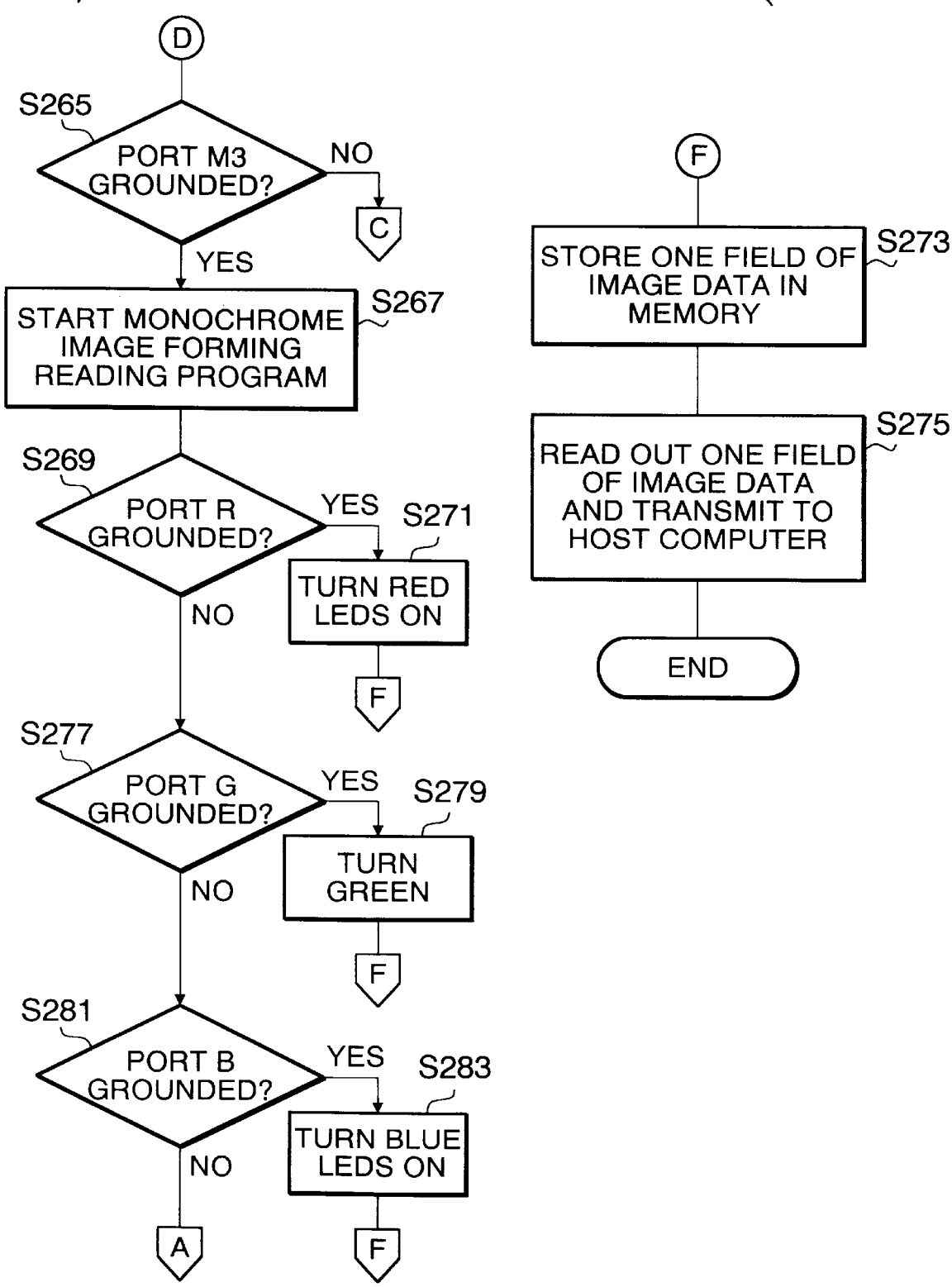

FIGS. 11A, 11B and 11C show a flowchart of an operation of the CPU 115 of the data symbol reading device 101 according to the second embodiment of the present invention.

Initially, step S201 determines whether the trigger switch 125 is turned ON. If the trigger switch 125 is turned ON (S201:Y), then step S203 determines whether the port M1 is grounded (i.e., port M1 is LOW as a result of the mode 1 being selected). otherwise (S201:N), step S201 is repeated.

If port M1 is grounded (S203:Y), then a data symbol reading program stored in an internal ROM of the CPU 115 is started, in step S205. Then, step S207 determines whether port R is grounded. If port R is grounded (S207:Y), then the CPU 115 controls the LED drive circuit 424 to turn the red LEDs 411 ON, in step S209. Simultaneously, the CCD drive circuit 6 controls the CCD 143 to start detecting the image data.

In step S211, one field of image data detected by the CCD 143 is stored in the image memory 11. In the preferred embodiment, since the illumination light is a single color, the image data detected by the CCD 143 and output by the CCD) drive circuit 6 is single color image data. After the image data is written in the image memory 11, the LEDs (e.g. red LEDs 411) are turned OFF by the LED driving circuit 424.

Then, in step S213, the comparator 10 compares the image data with the threshold data, in order to obtain binarized data equilvalent to one field of image data. The binarized data is then written in the portion B of the internal memory 151 of the CPU 115.

In step S215, the binarized data is read out from portion B of the internal memory 151. In accordance with the binarized data, the image contained within the edge (black periphery) of the data symbol 38 is recognized as the image that is to be decoded. This increases the speed of decoding the data symbol since the extraction of the image data is done by first detecting a black boundary and then extracting the (binarized) image data contained within the black boundary.

Step S217 then decodes the extracted image data using the image processes mentioned above. The decoded data and the mode data are then transmitted to the host computer 17 via the communnmication driver 16, in step S219. The routine then ends.

However, in case port R is not grounded (S207:N), then step S221 determines whether port G is grounded. If port G is grounded (S221:Y), then the CPU 115 controls the LED drive circuit 424 to turn the green LEDs 414 ON, in step S223. Simultaneously, the CCD drive circuit 6 controls the CCD 143 to start detecting the image data. Then steps S211 through S219 described above, are executed, and the routine ends.

Further, in case port G is not grounded (S221:N), then step S225 determines whether port B is grounded. If port is grounded, then the CPU 115 controls the LED drive circuit 424 to turn the blue LEDs 415 ON, in step S227. Simultaneously, the CCD drive circuit 6 controls the CCD 143 to start detecting the image data. Then steps S211 through S219 described above, are executed, and the routine ends.

If mode 1 was not selected, and therefore port M1 was not grounded (S203:N), then step S231 determines whether mode 2 was selected, by checking if port M2 is grounded.

If the port M2 is grounded (S231:Y), then a color imaging forming program is started in step S233. Then, in step S235, the CPU 15 controls the LED driving circuit 424 to turn the red LEDs 411 ON. Simultaneously, the CCD drive circuit 6 controls the CCD 143 to start detecting the image data.

In step S237, one field of image data detected by the CCD 43 is stored in the image memory 11. In this case, since the illumination light is a single color (i.e., red) and the image data detected by the CCD 43 and output by the CCD drive circuit 6 is the red image data.

Then in step S239, the red image data is read out from the image memory 11, and transmitted to the host computer 17 via the communication driver 16. In step S241, the illumination data is read out from a portion C of the internal memory 151 of the CPU 115, and then transmitted to the host computer 17 via the communication driver 16.

Then in step S243, the CPU 115 controls the LED drive circuit 424 to turn the red LEDs 411 OFF.

Then in step S245, the CPU 115 controls the LED driving circuit 424 to turn the green LEDs 414 ON. Simultaneously, the CCD drive circuit 6 controls the CCD 143 to start detecting the image data.

In step S247, one field of image data detected by. the CCD 143 is stored in the image memory 11. In this case, since the illumination light is a single color (i.e., green) and the image data detected by the CCD 43 and output by the CCD drive circuit 6 is the green image data.

Then in step S249, the green image data is read out from the image memory 11, and transmitted to the host computer 17 via the commun, cation driver 16. In step S251, the illumination data is read out from a portion C of the internal memory 151 of the CPU 115, and then transmitted to the host computer 17 via the ccmmunication driver 16.

Then in step S253, the CPU 115 controls the LED drive circuit 424 to turn the green LEDs 414 OFF.

Then in step S255, the CPU 115 controls the LED driving circuit 424 to turn the blue LEDs 415 ON. Simultaneously, the CCD drive circuit 6 controls the CCD 143 to start detecting the image data.

In step S257, one field of image data detected by the CCD 43 is stored in the image memory 11. In this case, since the illumination light is a single color (i.e., blue) and the image data detected by the CCD 143 and output by the CCD drive circuit 6 is the blue image data.

Then in step S259, the blue image data is read out from the image memory 11, and transmitted to the host computer 17 via the communication driver 16. In step S261, the illumination data is read out from a portion C of the internal memory 151 of the CPU 115, and then transmitted to the host computer 17 via the communication driver 16.

Then in step S263, the CPU 115 controls the LED drive circuit 424 to turn the blue LEDs 415 OFF.

If mode 2 was not selected, and therefore the port M2 was not grounded (S231:N), then step S265 determines whether mode 3 was selected, by checking if port M3 is grounded.

If the port M3 is not grounded (S263:N), then control returns to step S201. Otherwise (S265:N), a monochrome image forming reading program is started in step S267.

Then, step S269 determines whether port R is grounded (i.e., made LOW). If port R is grounded (S267:Y), then the CPU 115 controls the LED driving circuit 424 to turn the red LEDs 411 ON, in step S271. Then, in step S273, one field of image data detected by the CCD 143 is stored in the image memory 11. Since the illumination light is a single color (i.e., red), the image detected by the CCD 143 and output by the CCD drive circuit 6 is the red image data. Further, the CPU 115 controls the LED driving circuit 424.

In step S275, the image data is read out from the image memory 11 and the image data and mode data are transmitted to the host computer 17, via the communication driver 16. The routine then ends.

However, in case port R is not grounded (S269:N), step S277 determines whether port G is grounded. If port G is grounded (S277:Y), then the CPU 115 controls the LED drive circuit 424 to turn the green LEDs 414 ON, in step S279. Simultaneously, the CCD drive circuit 6 controls the CCD 143 to start detecting the image data. Then, steps S273 and S275 described above, are executed, and the routine ends.

Further, in case port G is not grounded (S277:N), then step S281 determines whether port B is grounded. If port B is grounded (S281:Y), then the CPU 115 controls the LED drive circuit 424 to turn the blue LEDs 415 ON, in step S283. Simultaneously, the CCD drive circuit 6 controls the CCD 143 to start detecting the image data. Then steps S273 and S275 described above, are executed, and the routine ends.

Thus, with a data symbol reading device 101 according to the second preferred embodiment, it is possible to read the data symbols 38 and form an electronic image of an object (i.e., generate image signals in accordance with a detected image of an object, such as a data symbol). Furthermore, it is possible to select and generate either the color image data (color image signals) or the monochrome image data (monochrome image signals) and transmit the data to a peripheral unit such as a host computer 17, etc. Therefore, the utility of the data symbol reading device is improved. It is also possible to reduce the power consumption of the data symbol reading device 101 when compared with a data symbol reading device in which the illumination of the symbol reading area is done using a white light source.

According to the data symbol reading device 101, it is possible to generate color image data, and more specifically, red, green and blue image data using a monochrome CCD. The cost of a monochrome CCD is less than a color CCD, and therefore, the cost of the data symbol reading device 101 is reduced.

Figure 12:
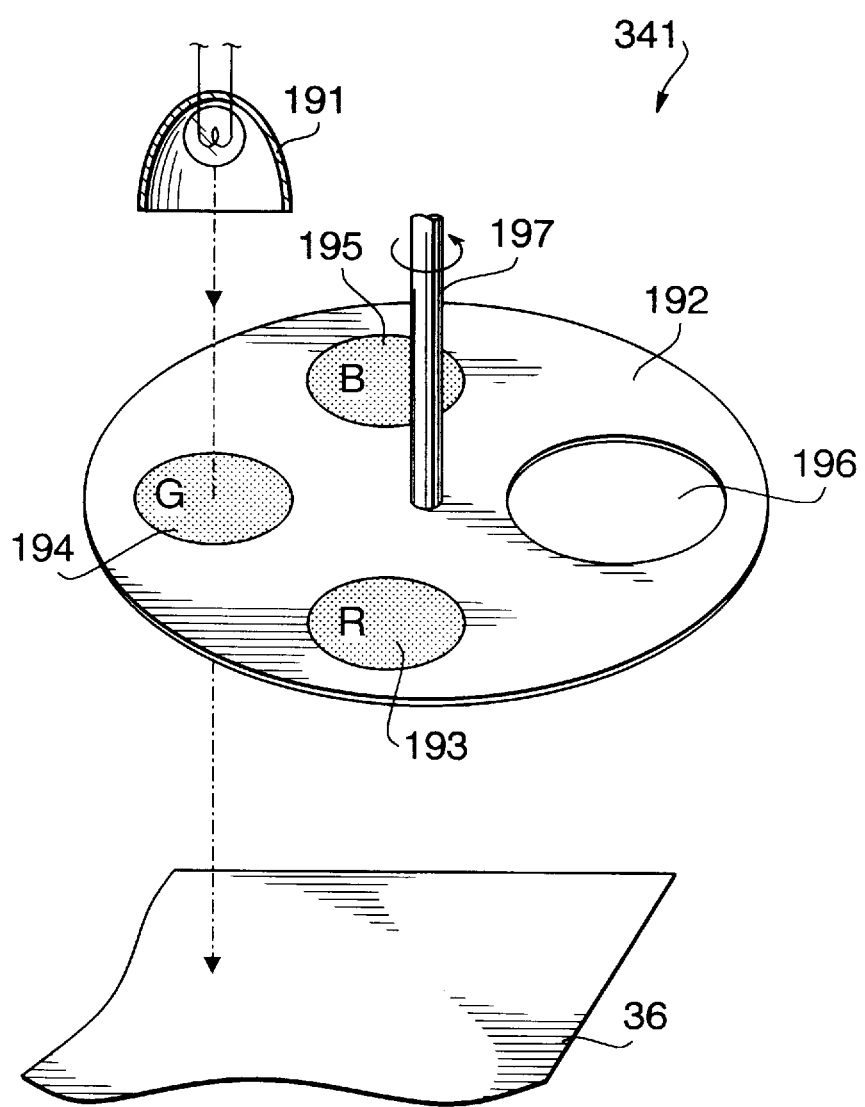
FIG. 12 is a perspective view showing another example of an illumination unit used in the data symbol reading device shown in FIG. 1.

In the second embodiment described above, the illumination unit 241 is not limited to the configuration illustrated herein. FIG. 12 shows a perspective view of another illumination unit 341 which can be used with the data symbol reading device of the present invention.

As shown in FIG. 12, the illumination unit 341 has a white light source 191, and a disk 192 which is rotatably installed beneath the white light source 191. The disk 192 has a rotary shaft 197 which can be rotated by a stepping motor (not shown) connected to the center of the disk 192.

The disk 192 includes a red filter 193, a green filter 194, and a blue filter 195, and a white light aperture 196. The red filter 193 allows the red component light emitted by the white light source 191 to pass therethrough. Similarly, the green filter 194 allows the green component light emitted by the white light source 191 to pass therethrough. Further, the blue filter 194 allows the blue component light emitted by the white light source 191 to pass therethrough. Therefore, by placing the one of the colored filters 193, 194 and 195, under the white light source 191, the symbol reading area 36 is illuminated with one of red, green or blue light respectively. Still further, the symbol reading area can be illuminated by white light through the white light aperture 196.

The present invention is not limited to the two embodiments of the data symbol reading device described above or shown in the drawings.

For example, the illumination unit is not limited to the types described above, but may include any light projection system in which a plurality of different kinds of light may be emitted. For example, an illumination unit which uses two different types of light sources, such as lasers, halogen lamps, etc. that are combined and selectively driven (including a case where two light sources are simultaneously driven), may be used.

Furthermore, the illumination unit may include a single light source, such as a white halogen lamp, which is used in combination with a plurality of different colored filters, which only allow light having specific wavelengths to pass therethrough.

Furthermore, in the present invention, the light source of the illumination unit may be changed manually, or automatically.

In each of the preferred embodiments, one field constitutes one screen image. However, the screen image is not limited to one field but may include one frame (i.e., two fields).

As described above, since a data symbol reading device according to the invention is provided with an illumination unit which can selectively project a plurality of different kinds of light onto an object, the utility of the data symbol reading device is improved.

Furthermore, for the data symbol reading device which can read data symbols and which can output an image of the data symbol, it is possible to decode the data symbols or to generate image signals corresponding to the an electronic image of the data symbol.

The present disclosure relates to subject matter contained in Japanese Patent Application No. HEI 7-179534, filed on Jun. 21, 1995, which is expressly incorporated herein by reference in its entirety.

What is claimed is:

1. A two dimensional data symbol reading device for reading a two dimensional data symbol, said device comprising:

a projecting system which projects a plurality of different colored light beams onto an object;

an imaging system having a light receiving surface, said imaging system outputting a signal corresponding to an image of the object;

an image forming system that forms an image of the object on the light receiving surface of the imaging system;

an output system; and a mode selecting system that selects one of a plurality of modes of operation of said two dimensional data symbol reading device including an image forming mode of operation in which the object is read and a signal corresponding to the image of the object is output by said output system, and a data symbol decoding mode of operation in which the two dimensional data symbol is read and a signal corresponding to decoded data of the two dimensional data symbol is output by said output system.

2. The data symbol reading device according to claim 1, further comprising a control system that controls the projecting system to project one of white light and another predetermined color of light.

3. The data symbol reading device according to claim 2, the projecting system comprising:

a white light source for emitting said white light; and another light source for emitting said another predetermined color of light.

4. The data symbol reading device according to claim 1, the projecting system comprising:

a first light source for emitting a first predetermined color;

a second light source for emitting a second predetermined color;

a third light source for emitting a third predetermined color; and a driving system which selectively drives the first light source, the second light source and the third light source, the data symbol reading device further comprising:

a control system which controls the driving system to drive only one of said first light source, said second light source and said third light source in response to said mode selecting system selecting said data symbol decoding mode of operation, and for controlling the driving system to sequentially drive said first light source, said second light source and said third light source in response to said mode selecting system selecting said image forming mode of operation.

5. The data symbol reading device according to claim 4, the imaging system outputting a monochrome image in response to said data symbol decoding mode being selected, the imaging system outputting a color image in response to said image forming mode being selected.

6. A data symbol reading device capable of reading a data symbol and of outputting an image signal corresponding to an image of an object, said data symbol reading device comprising:

an imaging device that outputs a signal corresponding to an image of the object;

an optical system for forming an image of the object on a light receiving surface of said imaging device;

an output system;

a mode selecting system that selects between a data symbol reading mode in which said data symbol is read and a signal corresponding to decoded data of the data symbol is output by said output system, and an image forming mode in which said image signal corresponding to the image of the object is output by said output system;

a light projecting system for selectively projecting a plurality of different colored light beams onto the object, said light projecting system changing a color of light in response to said mode selected by said mode selecting system; and a single processing system for decoding information stored in said data symbol and detected by said imaging device, in response to said data symbol reading mode being selected by said mode selection system, and for generating said image signal, in response to said image forming mode selected by said mode selection system.

7. The data symbol reading device according to claim 6, wherein said imaging device is provided with a color filter, and said imaging device detects color images, said light projecting system being capable of selectively projecting one of white light and monochromatic light.

8. The data symbol reading device according to claim 7, wherein said mode selecting system further selects between a color image forming mode and a monochrome image forming mode, wherein said light projecting system projects monochrome light in response to said data symbol reading mode being selected, wherein said light projecting system projects white light in response to said color image forming mode being selected, and wherein said light projecting system projects one of said monochromatic light and said white light in response to said monochrome image forming made being selected.

9. The data symbol reading device according to claim 6, wherein said imaging device detects monochromatic light, and wherein said light projecting system is capable of selectively projecting one of a plurality of monochromatic light beams.

10. The data symbol reading device according to claim 9, wherein said mode selecting system further selects between a color image forming mode and a monochrome image forming mode, wherein said light projecting system projects one of said plurality of monochromatic light beams in response to said data symbol reading mode being selected, wherein said light projecting system projects at least two of said plurality of monochromatic light beams in response to said color image forming mode being selected, and wherein said light projecting system projects one of said plurality of monochromatic light beams in response to said monochrome image forming mode being selected.

11. The data symbol reading device according to claim 10, wherein said light projecting system projects a first one of said plurality of monochromatic light beams, a second one of said plurality of monochromatic light beams and a third one of said plurality of monochromatic light beams, in order, in response to said color image forming mode being selected, and wherein said signal processing system generates a first image signal, a second image signal, and a third image signals, in order, in response to said color image forming mode being selected.

12. The data symbol reading device according to claim 6, further comprising a memory for storing data related to a mode of operation of said data symbol reading device.

13. The data symbol reading device according to claim 6, wherein said data symbol is a two-dimensional data symbol.

14. A data symbol reading device capable of decoding a data symbol and of forming an image of an object said device, comprising:

an illumination unit that illuminates the object, said illumination unit being capable of illuminating the object with a plurality of different colored light beams;

a reading unit that receives an image of the illuminated object, said reading unit outputting an image signal;

an operation mode selection switch which selects one of a plurality of modes of operation of said data symbol reading device, wherein the mode selection switch selects one of a data symbol reading mode, a monochrome image forming mode that forms a monochrome image of the object, and a color image forming mode that forms a color image of the object; and a control unit that illuminates said illumination unit to illuminate the object with one of said plurality of light beams in accordance with said mode of operation selected by said mode selection switch.

15. The data symbol reading device according to claim 14, said illumination unit comprising a white light source and a monochromatic light source, wherein said control unit controls said illumination unit to illuminate said data symbol with monochromatic light emitted by said monochromatic light source in response to said mode selection switch selecting said data symbol reading mode, and wherein said control unit controls said illumination unit to illuminate the object with white light emitted by said white light source in response to said mode selection switch selecting said color image forming mode.

16. The data symbol reading device according to claim 15, further comprising a light source selection switch for selecting one of said monochromatic light source and said white light source, wherein said control unit controls said illumination unit to illuminate the object with monochromatic light emitted by said monochromatic light source in response to said light source selection switch selecting said monochromatic light source and said mode selection switch selecting said monochrome image mode; and wherein said control unit controls said illumination unit to illuminate the object with white light emitted by said white light source in response to said light source selection switch selecting said white light source and said mode selection switch selecting said monochrome image mode.

17. The data symbol reading device according to claim 15, wherein said monochromatic light source comprises a plurality of LEDs, and wherein said white light source comprises a plurality of xenon lamps.

18. The data s reading device according to claim 14, said illumination unit comprising a plurality of monochromatic light sources, each of said monochromatic light sources being a different color, wherein said control unit controls said illumination unit to illuminate said data symbol with monochromatic light emitted by one of said monochromatic light sources in response to said mode selection switch selecting said data symbol reading mode and said monochrome image forming mode, and wherein said control unit controls said illumination unit to sequentially illuminate the object with monochromatic light emitted by each of said monochromatic light sources in response to said mode selection switch selecting said color image forming mode.

19. The data symbol reading device according to claim 18, further comprising a light source selection switch for selecting one of said monochromatic light sources.

20. The data symbol reading device according to claim 18, wherein said illumination unit comprises:

a first monochromatic light source having a plurality of red LEDs;

a second monochromatic light source having a plurality of green LEDs; and a third monochromatic light source having a plurality of blue LEDs.

21. The data symbol reading device according to claim 14, said illumination unit comprising:

a white light source; and a plurality of light filters, each of said light filters transmitting a different color of light therethrough.

* * * * *

UNITED STATES PATENT AND TRADEMARK OFFICE
CERTIFICATE OF CORRECTION

PATENT NO. : 5,877,487
DATED : March 2, 1999
INVENTOR(S) : N. Tani et al.

It is certified that error appears in the above-indentified patent and that said Letters Patent is hereby corrected as shown below:

At column 18, claim 15, (claim 8, line 13) of the printed patent, "made" should be ---mode---.

At column 18, line 54 (claim 14, line 2) of the printed patent, after "object" insert --- , ---.

At column 20, line 3 (claim 18, line 1) of the printed patent, "s" should be ---symbol---.

Signed and Sealed this

Twenty-eighth Day of March, 2000

Attest:

Q. TODD DICKINSON

*Attesting Officer*     *Commissioner of Patents and Trademarks*